(12) United States Patent
Perlow

(10) Patent No.: US 8,773,452 B2
(45) Date of Patent: Jul. 8, 2014

(54) COLOR DISPLAY CONVERTER FOR PINBALL MACHINES

(76) Inventor: Randall Bret Perlow, San Clemente, CA (US)

( * ) Notice: Subject to any disclaimer, the term of this patent is extended or adjusted under 35 U.S.C. 154(b) by 500 days.

(21) Appl. No.: 13/220,448

(22) Filed: Aug. 29, 2011

(65) Prior Publication Data

US 2012/0190440 A1   Jul. 26, 2012

Related U.S. Application Data

(60) Provisional application No. 61/434,434, filed on Jan. 20, 2011.

(51) Int. Cl.
| G09G 5/02 | (2006.01) |
| G09G 5/00 | (2006.01) |
| G06F 3/038 | (2013.01) |

(52) U.S. Cl.
CPC ................................. *G09G 5/003* (2013.01)
USPC ............................. 345/589; 345/204; 345/205

(58) Field of Classification Search
CPC ....................................................... G09G 5/003
USPC ........................................ 345/589, 204, 205
See application file for complete search history.

(56) References Cited

U.S. PATENT DOCUMENTS

| 4,439,762 | A | * | 3/1984 | Van Vliet et al. | 345/536 |
| 5,405,142 | A | * | 4/1995 | Arad et al. | 273/118 R |
| 5,610,630 | A | * | 3/1997 | Nakamura et al. | 715/788 |
| 5,611,731 | A | * | 3/1997 | Bouton et al. | 463/37 |
| 5,702,303 | A | * | 12/1997 | Takemoto et al. | 463/27 |
| 5,929,924 | A | * | 7/1999 | Chen | 348/552 |
| 6,272,283 | B1 | * | 8/2001 | Nguyen | 386/259 |
| 6,641,136 | B2 | * | 11/2003 | Huang | 273/121 R |
| 7,995,652 | B2 | * | 8/2011 | Washington | 375/240.11 |
| 2002/0080091 | A1 | * | 6/2002 | Acharya et al. | 345/2.1 |
| 2008/0140886 | A1 | * | 6/2008 | Izutsu | 710/69 |
| 2010/0077114 | A1 | * | 3/2010 | Izutsu | 710/62 |
| 2011/0115155 | A1 | * | 5/2011 | Frontiero, Jr. | 273/118 A |
| 2011/0164184 | A1 | * | 7/2011 | Avkarogullari et al. | 348/571 |
| 2013/0147111 | A1 | * | 6/2013 | Popadiuk | 273/118 A |

* cited by examiner

*Primary Examiner* — David T Welch

(74) *Attorney, Agent, or Firm* — Stetina Brunda Garred & Brucker

(57) ABSTRACT

A later generation display device may be connected to the video output port of an older electronic device which utilized an earlier generation display such as a dot matrix display. The early generation display is replaced with the later generation display. The display device includes software which receives graphic data through the video output port and identifies which frame is currently being streamed. The display device matches the frame being streamed to a stored graphic frame having a higher resolution and/or color. The matched frame is delivered to the later generation device so that the user can experience a higher quality visual effect by retrofitting the older electronic device with the later generation display.

16 Claims, 2 Drawing Sheets

COLOR DISPLAY CONVERTER FOR PINBALL MACHINES

CROSS-REFERENCE TO RELATED APPLICATIONS

This application claims the benefits of provisional patent application Ser. No. 61/434,434, filed on Jan. 20, 2011, the entire contents of which is expressly incorporated herein by reference.

STATEMENT RE: FEDERALLY SPONSORED RESEARCH/DEVELOPMENT

Not Applicable

BACKGROUND

The display device disclosed herein relates to a method and device for upgrading or altering a visual effect of an older machine having an earlier generation monitor (e.g., monochrome monitor).

Since the early 1990s, pinball games have incorporated low resolution (most commonly, 128×32), monochrome, dot-matrix displays to provide video animation and score information during gameplay. Games using these displays are generally capable of producing only grayscale (intensity only) video. The video usually contains 4-16 intensity levels, generated by transmitting a sequence of video frames to the dot-matrix display at a predetermined frame rate (e.g., greater than 60 Hz). By toggling dots on (full-intensity) and off, the average intensity at a dot location is modulated to produce perception of a desired grayscale level. Over the last two decades, many players and pinball collectors have sought an upgrade to this aging display technology but the high cost of redesigning software and hardware systems has impeded the introduction of color displays and upgrades.

BRIEF SUMMARY

The display device disclosed herein addresses the needs discussed above, discussed below and those that are known in the art. The display device disclosed herein is for use in conjunction with older pinball machines. The display device enhances the players experience by converting the game's standard grayscale video display to an upgraded video display. By way of example and not limitation, the upgraded video display may include a full-color representation, or a full-color high resolution representation. The display device may be connected to the pinball machine and provide improved visual experience without modification of game (e.g., pinball) software and is compatible with the game's existing display port. When properly connected to a pinball machine, the device may identify the received grayscale video frames in real-time, and retrieve associated color data stored within the device. The retrieved color data is used to either enhance or replace the original grayscale video frame to an improved color video frame. The improved color video frame may be output to a high resolution color display.

The display device disclosed herein provides one or more benefits or advantages. The following listing shall not be construed as an exclusive listing of benefits and advantages. Rather, the listing provides a listing of benefits and advantages that for certain embodiments or modifications of the embodiments disclosed herein could be achieved with the display device. By way of example and not limitation, the display device may be compatible with existing game display software and hardware, and may be used to upgrade and incorporate color into games without hardware or software redesign.

The display device may utilize a game's normal interface and cable to connect to the game's display port, making it easy to replace a standard low-resolution, monochrome (also referred to as grayscale), dot-matrix display with a multicolor displayor a high resolution full color display.

The display device may also produce an enhanced colorized video frame by combining a received monochrome video frame with color data stored internal to the device.

The display device may produce a custom color video frame by replacing a received monochrome video frame with custom frame data stored internal to the device. The custom frame need not bear any resemblance to the original frame. In other words, the graphic sequence of the original game may be replaced with a different graphical sequence. By way of example and not limitation, if the original graphical sequence displayed a sea monster creature waving its arms when 100 points is attained, then the new graphical sequence may be an alien creature waving its arms when 100 points is attained. In this manner, one or more themes may be programmed into the display device and the theme may be selected by the player or owner as desired.

The display device is also capable of producing a color video frame of higher resolution than the input video frame. The high resolution output can be used to draw custom shapes to emulate the dots in a standard dot-matrix display, or alternately to display custom high-resolution video frames stored or generated by the device.

In the display device, the data used for frame identification and color processing may be stored in programmable memories, and can be customized for use with many different game titles.

The display device may perform color frame-processing in real-time and synchronously with game play.

The display device may also convert a game's normal output frame rate to a slower rate compatible with high resolution monitors and displays.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
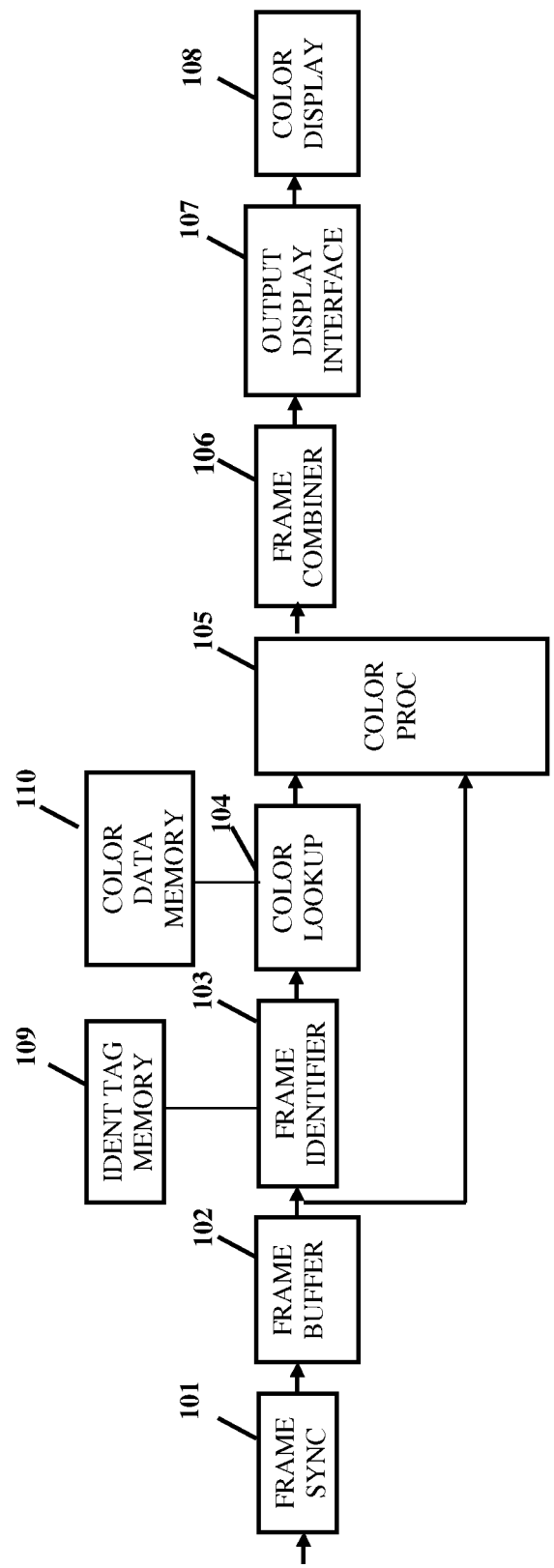
FIG. 1 is a block diagram showing the processing performed by software and hardware of an improved display device.

Referring now to the drawings, the display device may include software and hardware. The hardware components may include a connector which connects the display device to the video output port of an existing game. The connector receives data from the video output port of the existing game. The hardware components may also include one or more microprocessors, microcontrollers, or programmable logic devices (including field-programmable gate arrays, or FPGAs) which use software to process game data and generate a new color video output signal. The software includes a frame synchronizer 101 which organizes the data into frames. The software also includes a frame identifier 103 which identifies the frames organized by the frame synchronizer 101 by generating a unique tag for each frame. The generated tag may be compared to preprogrammed tags of frames in a tag lookup table 109. The preprogrammed tags may be associated with multicolor or high resolution graphical data which can be combined with the original monochrome game or alternately used to replace the original game frames. The output is new color frames that may be representative of the original graphics or is a new theme. The new color frames may be further combined by the device to create output frames which contain more color intensities than the original game frames. The data may be output to a full color display, a full color high resolution display, or other display as desired.

A block diagram describing the processing performed by the display device is provided in FIG. 1. A connection is made from a game's video output port to the input of a frame synchronizer 101. The frame synchronizer organizes the data received from the game into frames and conveys the frames to a frame buffer 102 which stores one or more input video frames. The output of the frame buffer is connected to a frame identifier 103 and color processor 105 for further processing.

The frame identifier 103 processes data from the frame buffer 102 in order to generate an identification tag and the tags are compared to the contents of an attached programmable identification tag memory 109. The frame identifier stores memory pointers that are used by a connected color lookup 104 to access color data associated with the identified frames. The color lookup 104 reads color data from an attached programmable color data memory 110 and converts the stored data to red, green, and blue amplitudes which are passed to the color processor 105.

The color processor 105 combines the data from the color lookup 104 and the input frame buffer 102 to produce high-resolution color video frames which are output to a frame combiner 106. The frame combiner 106 combines multiple color frames together to generate a composite output frame and passes the composite frame to the output display interface 107. The output display interface 107 reformats the data and delivers it to a connected color display 108.

The display device overcomes this obstacle by providing a solution that is compatible with existing game hardware and software systems, and can be used to upgrade older games for which no inherent color processing exists. The device includes programmable memories which are configured prior to normal device operation. The memories contain data used for frame identification and color processing, and are organized in lookup tables that are accessed during gameplay. The data stored in these memories is generated offline by processing captured video sequences achieved through prior game play or manipulation.

Because the video sequences displayed by pinball machines often recur from one play of the game to another, captured video frames can be obtained offline and processed to generate frame identification tags and associated color data. Frame identification tags are generated by processing regions of the video frame that contain salient features and ignoring features that may be prone to change during game play, such as player scores. An artist uses computer methods to create associated color data for the original frames or creates new color frames. The frame identification tag and corresponding color information is then stored in the device lookup tables, implemented by programmable memories.

During normal operation, the same identification processes are used to generate tags for each input frame, and the tags are compared to those previously stored in the internal lookup table. When a match is found, the associated color data is retrieved and used to enhance or replace the input frame. If a match is not found, the display device may display the unaltered input frame using a default color. The colorized frame is displayed by the device on a color display or monitor.

In the following, more detailed information is provided about the internal processes performed by the software of the display device. The inputs to the frame synchronizer 101 are digital signals delivered by the normal display interface of a pinball machine. The interface includes a serial data signal, one or more synchronization signals for identifying the start of a new frame, and a clock for latching the data and synchronization signals. The frame synchronizer identifies frame boundaries by monitoring the synchronization signals for indication of the start of a new frame. Serial data is captured and organized into data words which represent the intensity levels for each dot in the input video frame. Video frames from the pinball machine may be organized into data words that use a single dot to represent the on or off state of each dot in a binary video frame. Alternatively, video frames from the pinball machine may be organized into data words that use multiple bits to represent each dot to produce a grayscale frame containing more than two intensity levels.

The organized video frame data is stored to a video frame buffer 102 which is capable of storing multiple video frames. The memory is organized as a circular buffer, meaning that as the memory fills older data is overwritten by newer data. Buffer writes and reads may occur asynchronously so that data can be output from the buffer at a different frame rate than it is received. The frame buffer 102 is not required for all embodiments of the display device. Its main purpose is to support the recall of prior binary frames for frame identification and/or color processing, but can be bypassed when this feature is not required.

When present, the frame buffer 102 should be at least three to five times the size of one input video frame. The stored video frames may be combined to produce an output video frame with more intensity levels than the original stored frames. By way of example and not limitation, three stored binary frames can be combined to produce an internal grayscale representation with four intensity levels. More than three frames of storage are useful for frame rate conversion when the output frame rate is asynchronous to the input frame rate. Storage of five frames can be used to produce grayscale images and utilize triple buffering techniques for frame rate conversion. Triple buffering prevents stored frame data from being overwritten by new frame data while the stored frame is being read from the buffer. With triple buffering, the three most recent complete frames are read from the buffer while older frame data is overwritten by new input frame data.

The output of the frame buffer 102 is connected to a frame identifier 103. The frame identifier 103 processes the data from one or more stored input video frames and performs region-based pattern matching against a set of known patterns. A detailed block diagram showing the processes employed for the frame identifier 103 is provided in FIG. 2.

Data masks 201 are used to identify regions for matching and a hash function 202 is applied to reduce the input frame data to a set of small tags that can be used for matching. Each mask identifies specific dot locations to be used for pattern matching. Locations that are not part of the mask are not processed, or their data are replaced with known values so that the locations are effectively ignored during matching. By way of example and not limitation, the data masks 201 may be applied to each 128×32 input frame. The data masks are defined offline during creation of the tag lookup table 109 and color lookup table 110, and parameters defining the masks are stored to the device along with the game-specific tag and color data. The output of the data mask is applied to a hash processor 202 that performs a Jenkins hash function and produces a 32-bit tag for table lookup 203. The accessed tables are stored in the attached identification tag memory 109.

The identification tag memory 109 is organized into lists of numerically ordered tags. For each tag, the memory stores a data pair comprised of the tag value and an associated memory pointer. The memory pointer specifies an address in the color data memory 110 for retrieving color data associated with the stored input video frames. The tag and color data memories are programmable. Their contents are created offline, customized for each game title, and stored to the device.

Figure 2:
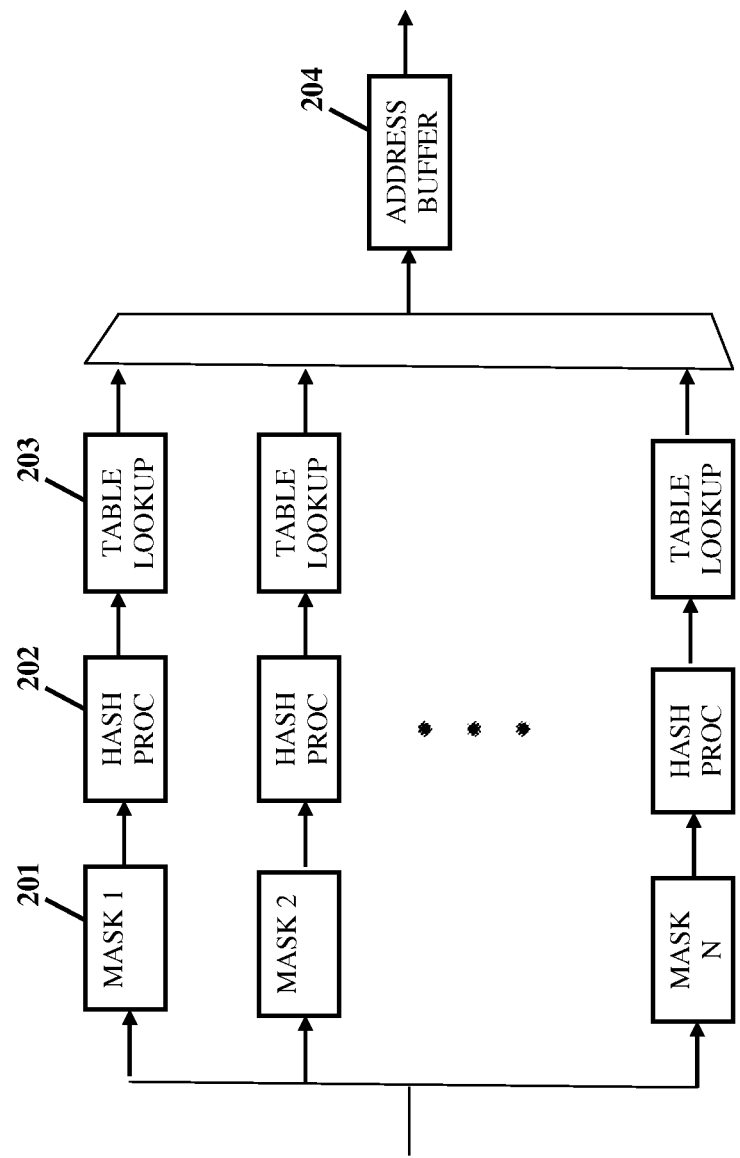
FIG. 2 is a detailed block diagram of an embodiment of the frame identifier processing.

In FIG. 2, the display device employs a small tag table lookup 203 for each defined mask. By searching multiple lists, each associated with a specific mask, searches can be performed more rapidly than searching one large list. To perform pattern matching, the generated tags are compared to the stored tags values using binary search techniques. If a match is found, the associated memory address pointer is returned and stored to an address buffer 204 for further processing. Otherwise, a default value is written to the buffer to indicate no match was found. Like the frame buffer 102, the address buffer 204 is organized as a circular buffer and supports the recall of color addresses from prior frames. The address buffer 204 contents are accessed by the color lookup 104 to locate associated color data in the color data memory 110.

The color data memory 110 is programmed offline and stores custom color data used to enhance or substitute the game's normal monochrome frame data. The contents of the color data memory 110 are encoded and compressed to reduce storage requirements. The color lookup 104 reads the color data memory 110 and performs all required memory decoding and decompression, and outputs red, green, and blue (RGB) color amplitude data to the color processor 105.

In the embodiment discussed herein, the color data memory 110 stores associated color data for each dot in a 128×32 input video frame. Color data is prepared by an artist offline, and stored as a series of 4-bit indices to a RGB lookup table. One color index is stored for each of the 128×32 locations. To reduce storage requirements, each of the 32 rows of color indices is compressed using run-length encoding so that strings of consecutive color indices are replaced by the color index and a count. During color lookup 104, the encoded color indices are read starting from a memory location specified by the address buffer 204. As color data is read from the memory, decoding is performed to decompress the string of color indices and the color indices are used to look up a triplet of 6-bit RGB values from a stored RGB lookup table. The uncompressed RGB data is then output to the color processor 105.

The inputs to the color processor 105 are the RGB data from the color lookup 104 and the dot intensity data from the input frame buffer 102. The color processor combines the retrieved color data with the input frame buffer intensities to produce a colorized version of the input frame. The color processor also converts the combined data to an output format and resolution that is compatible with the color display 108. For color enhancement modes of operation, the input frame intensities are used to modulate the input RGB color amplitudes and outputs brighter or darker shades of the input color. For color substitution modes of operation, the input frame intensities may be ignored (and in some embodiments, may not even be present) and the input color amplitudes are transmitted to the output directly.

The displayed output frame resolution may be equal to greater than the input frame resolution. In the current embodiment, a 128×32 input frame is displayed using a higher resolution by mapping the input frame to 1280×320 pixels of a 1366×768 high-resolution flat panel display. To emulate the dots produced by a dot-matrix display, after color combining each colorized dot is mapped to a 10×10 pixels in the output frame. Within each 10×10 region, a set of pixels are set to the same RGB amplitudes to produce the appearance a circular-shaped dot in the output video frame. The high resolution output from the color processor 105 is conveyed to a frame combiner 106.

The frame combiner combines one or more colorized frames to produce a final composite output frame to be sent to the display. The frame combiner improves video quality and helps to eliminate flicker when the output frame rate is slower than the input frame rate. In the current embodiment, the input frame rate is approximately 120 Hz and the output frame rate is 60 Hz. The frame combiner sums the color amplitudes from a sequence of three colorized frames to produce a single composite colorized output frame.

The composite colorized output frame is passed to the output display interface 107 which formats the data using an industry standard video interface and transmits the data to a color display 108. In the current embodiment, this may be performed using low-voltage differential signaling (LVDS) over a 30-pin flat panel display interface cable. The red, green, and blue color data are transmitted serially using a standard signaling method specified by the display manufacturer. The color display 108 is implemented using a high-resolution Chi Mei Optronics M156B1-L02 flat panel LCD monitor.

There are many alternate embodiments of the display device. Some of these include:

The frame identifier 103 may use multiple input frames for pattern matching. One such embodiment combines multiple input frames from the frame buffer 102 and performing masking 201 and hashing 202 on grayscale image representations.

The frame identifier may perform masking 201 and hashing 202 on each of a group of input frames in the ordinary manner but then combines the resulting tags into a composite tag before table lookup 203.

The regions used for masking 201 may be adaptively determined from partial frame data. For example, a pattern of dots that matches an alphanumeric character (like the number "0" in a player score) can be used to identify and mask out a larger region of dots that encompasses the entire score.

The Jenkins hash function used by the hash processor 202 may be replaced by any mathematical or logic operation that reduces the input data to a smaller sized tag that can be used in a table lookup.

The tag produced by the hash processor may be sizes other than 32-bits.

The color processor 105 or frame combiner 106 may perform addition processing to conceal or colorize unidentified frames instead of displaying them with a default color. Unidentified frames may be concealed by holding a previous frame. Unidentified frames may be colorized using color data obtained from a previously identified frame. Other methods for concealing or colorizing unidentified frames are possible.

The color lookup 104 and attached color data memory 110 may process and store compressed or uncompressed high-resolution color data that will be substituted for the low-resolution input data. JPEG is a common image compression technique but others are possible. When compression is used, the color lookup 104 would be modified to include corresponding decompression techniques to recover the high resolution RGB data and provide this data directly to the color processor 105 for color substitution.

The color data memory 110 could store RGB values directly instead of color indices.

The color lookup 104 could map low resolution dots to shapes other than circles, and could add additional color variation to the mapped shape to produce interesting color or lighting effects.

The output display interface 107 could make use of any other standard video interfaces or connectors like VGA, or could use any size flat panel interface connector such as 20-pin or 40-pin connectors.

The high-resolution display 108 may be implemented using any color monitor or flat panel display device that contains higher resolution than the input frame data.

The various hardware and software aspects of the display device described herein may be implemented in a field-programmable gate array ("FPGA") in the form of what is often referred to as programmable hardware. The FPGA may also include the use of an embedded microcontroller used to carry out one or more of the tasks disclosed herein. "Firmware" may refer to embedded software for the microcontroller. The display device may also include true software which runs on a personal computer which is used to colorize the monochrome frames and generate ROM files that contain data and/or instructions for use by the display device to carry out the coloring process.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A display device for providing an upgraded graphical experience, the device comprising:
    an input connector for receiving electronic graphical data suitable for an early generation display, the input connector connected to a video output port of an electronic device having the early generation display;
    a processor performing the following steps:
        receiving the electronic graphical data through the video output port;
        defining frames from the electronic graphical data;
        generating a tag for each of the frames;
        matching the generated tag to a set of preprogrammed tags;
        retrieving one or more colors associated with the matched preprogrammed tags;
        processing two or more frames to determine an intensity of the retrieved one or more colors;
        overlaying the one or more colors and the intensity with the electronic graphical data received through the video output port to produce output graphical data; and
        outputting the output graphical data based on the matched preprogrammed tags; and
    a later generation display connected to the processor, the later generation display receiving and displaying the output graphical data.

2. The device of claim 1 wherein the output graphical data defines more colors, a higher resolution or both compared to the electronic graphical data received from the electronic device.

3. The device of claim 1 wherein the electronic graphical data is suitable for a dot matrix display.

4. The device of claim 1 wherein the later generation display is a multicolor display, a high resolution full color display, or a high resolution display.

5. The device of claim 1 wherein the electronic device is a pinball machine.

6. The device of claim 1 wherein the early generation display is a dot matrix display and the later generation display is a liquid crystal display.

7. The device of claim 1 wherein in the outputting step, the output graphical data is a theme.

8. The device of claim 1 wherein the output graphical data is a new theme synchronized to the received electronic graphical data.

9. The device of claim 1 wherein the processor further performs the step of: overlaying the one or more colors with the electronic graphical data received through the video output port to produce the output graphical data.

10. A method for providing upgraded graphics to an electronic device having an early generation display, the method comprising the steps of:
    connecting to a video output port of the electronic device having the early generation display;
    receiving electronic graphical data suitable for the early generation display from the video output port of the electronic device having the early generation display;
    defining frames from the electronic graphical data;
    generating a tag for each of the frames;
    matching the generated tag to a set of preprogrammed tags;
    retrieving one or more colors associated with the matched preprogrammed tags;
    processing two or more frames to determine an intensity of the retrieved one or more colors;
    combining the electronic graphical data received through the video output port with the one or more colors and the intensity to produce output graphical data; and
    outputting the output graphical data based on the matched preprogrammed tags to a later generation display.

11. The method of claim 10 further comprising the step of buffering the defined frames.

12. The method of claim 10 further comprising the step of:
    capturing the electronic graphical data and organizing the electronic graphical data as serial data for each dot within the defined frames.

13. The method of claim 10 wherein the generating step includes the steps of:
    recognizing regional patterns from a plurality of locations on the frames;
    generating the tags based on the recognized regional patterns.

14. The method of claim 13 further comprising the step of defining each of the regional patterns as a mask of a plurality of masks.

15. The method of claim 14 further comprising the step of providing a table for each mask of the plurality of masks.

16. The method of claim 10 further comprising the step of replacing the defined frames with preprogrammed frames associated with the matched preprogrammed tags.

* * * * *